United States Patent
Lahnala (10) Patent No.: US 9,308,801 B2
(45) Date of Patent: Apr. 12, 2016

(54) VERTICAL SLIDING WINDOW ASSEMBLY FOR A VEHICLE

(71) Applicants: AGC Automotive Americas R&D, Ypsilanti, MI (US); AGC Flat Glass North America Inc., Alpharetta, GA (US)

(72) Inventor: David W. Lahnala, Adrian, MI (US)

(73) Assignees: AGC AUTOMOTIVE AMERICAS R & D, INC., Ypsilanti, MI (US); AGC FLAT GLASS NORTH AMERICA, INC., Alpharetta, GA (US)

( * ) Notice: Subject to any disclaimer, the term of this patent is extended or adjusted under 35 U.S.C. 154(b) by 0 days.

(21) Appl. No.: 14/373,666

(22) PCT Filed: Jan. 24, 2013

(86) PCT No.: PCT/US2013/022905
§ 371 (c)(1),
(2) Date: Jul. 22, 2014

(87) PCT Pub. No.: WO2013/112694
PCT Pub. Date: Aug. 1, 2013

(65) Prior Publication Data
US 2015/0028622 A1 Jan. 29, 2015

Related U.S. Application Data

(60) Provisional application No. 61/590,203, filed on Jan. 24, 2012.

(51) Int. Cl.
*B60J 1/00* (2006.01)
*B60J 1/18* (2006.01)
*B60J 10/00* (2006.01)
*B60J 10/04* (2006.01)
*B60J 1/17* (2006.01)
*E06B 3/44* (2006.01)

(52) U.S. Cl.
CPC *B60J 1/1861* (2013.01); *B60J 1/17* (2013.01); *B60J 1/18* (2013.01); *B60J 10/0062* (2013.01); *B60J 10/041* (2013.01); *B60J 10/042* (2013.01); *E06B 3/44* (2013.01)

(58) Field of Classification Search
CPC ........ B60J 10/04; B60J 10/041; B60J 10/042; B60J 1/007; B60J 1/17; B60J 1/18; B60J 1/1861
See application file for complete search history.

(56) References Cited

U.S. PATENT DOCUMENTS 6,223,470 B1 * 5/2001 Millard et al. ................. 49/374
6,260,905 B1 * 7/2001 Wagner .................... 296/146.16

(Continued)

OTHER PUBLICATIONS

International Search Report for PCT/US2013/022905 dated Mar. 6, 2013, 2 pages.

*Primary Examiner* — Katherine Mitchell
*Assistant Examiner* — Scott Denion
(74) *Attorney, Agent, or Firm* — Howard & Howard Attorneys PLLC (57) ABSTRACT

A vertical sliding window assembly can be coupled to a flange of a vehicle. The vertical sliding window assembly includes a first fixed panel and a second fixed panel adapted to be fixed to the vehicle. The first and second fixed panels have a top edge and a bottom edge spaced from each other. First and second vertical tracks are coupled to and extends between the top and bottom edges of a respective one of the first and second fixed panels. Each of the vertical tracks have a bottom end adjacent the bottom edge of a respective one of the fixed panels. A sliding panel is movable along the first and second vertical tracks relative to the fixed panels. The bottom end of each of the first and second vertical tracks terminates between the top and bottom edges of the fixed panels.

23 Claims, 5 Drawing Sheets

(56) References Cited

U.S. PATENT DOCUMENTS

| | | |
|---|---|---|
| 6,691,464 B2 | 2/2004 | Nestell et al. |
| 8,246,101 B2 * | 8/2012 | Cicala .................. 296/146.16 |
| 2003/0182865 A1 * | 10/2003 | Nestell et al. .................. 49/374 |
| 2009/0241426 A1 * | 10/2009 | Seiple et al. .................. 49/374 |
| 2010/0122497 A1 * | 5/2010 | Lahnala .................. 49/413 |
| 2015/0042127 A1 * | 2/2015 | Lahnala .................. 296/190.1 |

* cited by examiner

VERTICAL SLIDING WINDOW ASSEMBLY FOR A VEHICLE

CROSS-REFERENCE TO RELATED APPLICATIONS

This application is the National Stage of International Patent Application No. PCT/US2013/022905, filed on Jan. 24, 2013 which claims priority to and all advantages of U.S. Provisional Patent Application Ser. No. 61/590,203, which was filed on Jan. 24, 2012, the entire specification of which is expressly incorporated herein by reference.

BACKGROUND OF THE INVENTION

1. Field of the Invention

The invention generally relates to a sliding window assembly. More specifically, the invention relates to a vertical siding window assembly for a vehicle.

2. Description of the Related Art

Sliding window assemblies for vehicles are known in the art. Generally, the sliding window assemblies are mounted to a rear window body or flange of the vehicle. A conventional sliding window assembly includes first and second fixed panels configured to be coupled to the vehicle. The first and the second fixed panels are spaced from each other thereby defining an opening therebetween. A sliding panel is movable relative to the fixed panels between a closed position and an open position to modify a size of the opening.

Typically, the sliding window assembly includes vertical tracks for guiding the sliding panel between the open and closed position. The vertical tracks extend beyond a periphery of the fixed panels for allowing to the sliding panel to move beyond the limits of the fixed panels.

Generally, an adhesive mechanism is applied to the fixed panels to secure the sliding window assembly to the vehicle. However, because the vertical tracks extend beyond the periphery of the fixed panels, the entire periphery of the fixed panels does not receive the adhesive mechanism. Additionally, the sliding window assembly is awkward to install on the vehicle because of the vertical tracks extending beyond the periphery of the fixed panels. For example, vertical tracks must first be positioned into the proper position, typically within a void space defined by a wall of the vehicle. Because the vertical tracks must be inserted into the void space, the installation of the sliding window assembly is more time consuming Additionally, the adhesive mechanism that is applied to the fixed panels, which is applied to the fixed panels before installation, may inadvertently contact the flange of the vehicle causing the adhesive to be smeared to even removed from the fixed panel. Smearing or removing the adhesive from the fixed panels weakens the installation of the sliding window assembly. Additionally, smearing the adhesive mechanism can cause a failure of the bonding between the sliding window assembly and the flange resulting in fluid entering the vehicle. Furthermore, less preferred adhesive mechanisms, such as adhesive mechanisms comprising butyl are used because adhesive mechanisms comprising urethane are more susceptible to smearing. Therefore, there remains a need to provide an improved sliding window assembly.

SUMMARY OF THE INVENTION AND ADVANTAGES

A vertical sliding window assembly can be coupled to a flange of a vehicle. The vertical sliding window assembly includes a first fixed panel adapted to be fixed to the vehicle. The first fixed panel has a top edge and a bottom edge spaced from each other. A second fixed panel is adapted to be fixed to the vehicle and is spaced from the first fixed panel to define an opening therebetween. The second fixed panel has a top edge and a bottom edge spaced from each other. A first vertical track is coupled to and extends between the top and bottom edges of the first fixed panel. The first vertical track has a bottom end adjacent the bottom edge of the first fixed panel and a top end adjacent the top edge of the first fixed panel. A second vertical track is coupled to and extends between the top and bottom edges of the second fixed panel. The second vertical track has a bottom end adjacent the bottom edge of the second fixed panel and a top end adjacent the top edge of the second fixed panel. A sliding panel is movable along the first and second vertical tracks relative to the fixed panels between a closed position and an open position such that a size of the opening can be modified. The bottom end of the first vertical track terminates between the top and bottom edges of said first fixed panel and the bottom end of the second vertical track terminates between the top and bottom edges of the second fixed panel. Because the bottom end of the first and second vertical tracks terminate between the top and bottom edges of the fixed panels, the vertical sliding window assembly is easier to install on the vehicle.

BRIEF DESCRIPTION OF THE DRAWINGS

Advantages of the present invention will be readily appreciated, as the same becomes better understood by reference to the following detailed description, when considered in connection with the accompanying drawings.

DETAILED DESCRIPTION

Figure 1:
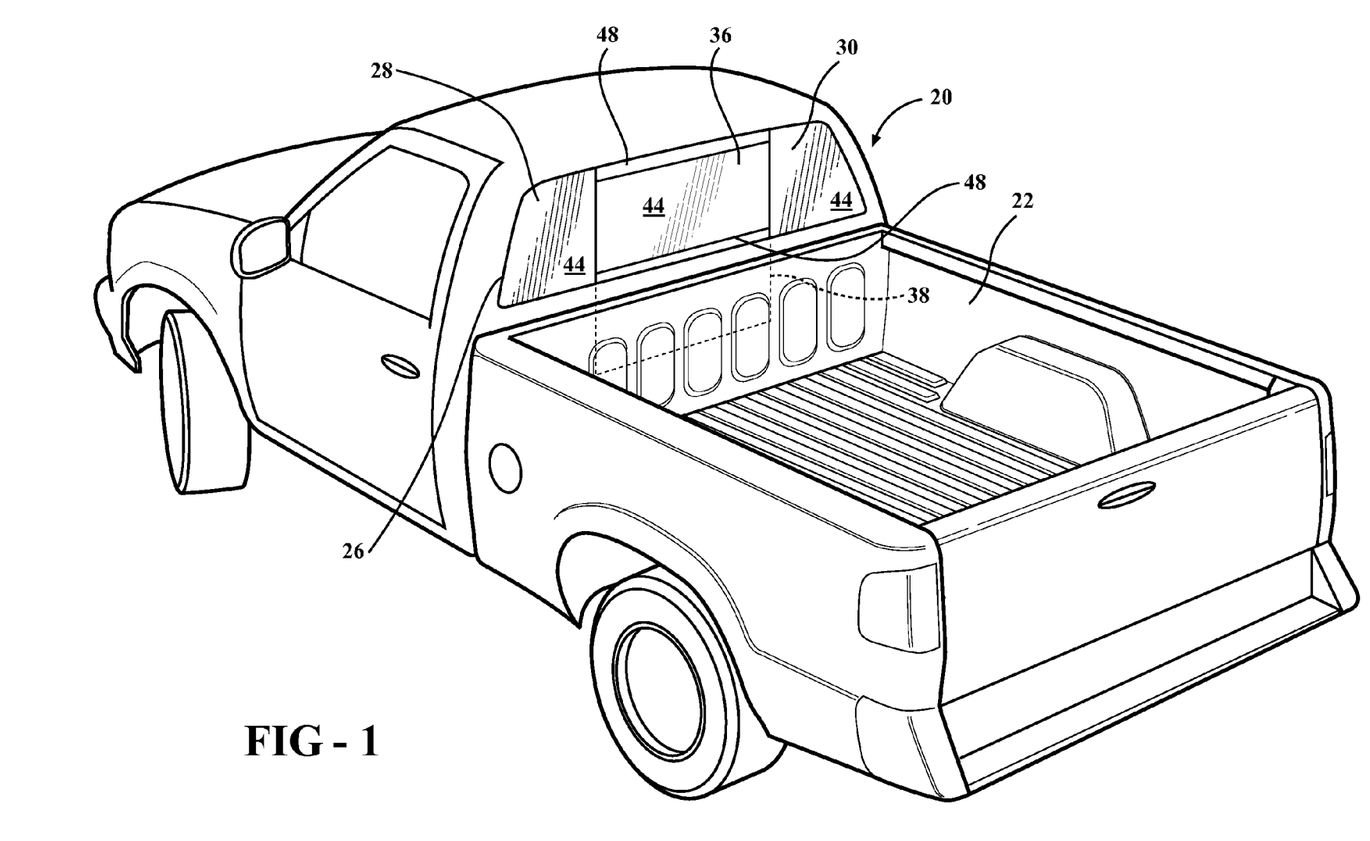
FIG. 1 is a prospective view of a vehicle including a vertical sliding window assembly.
Figure 2:
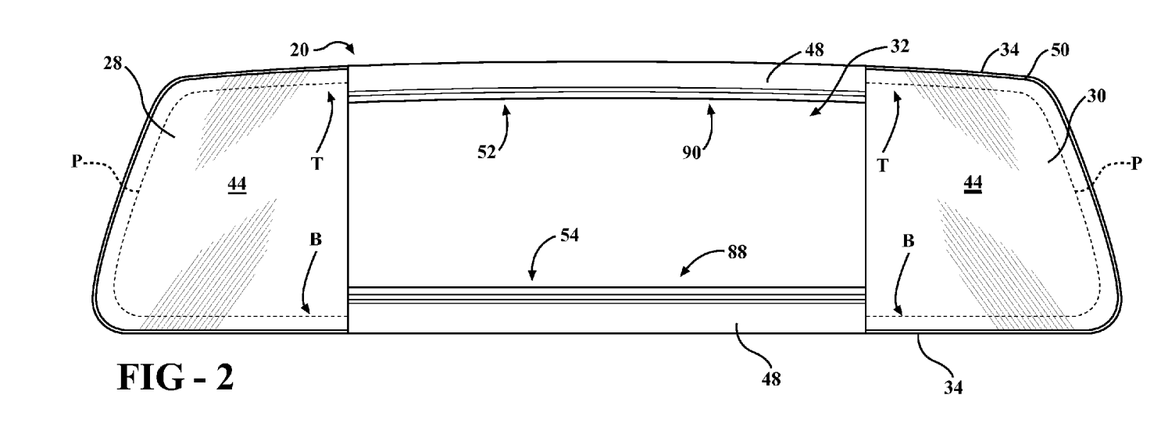
FIG. 2 is a plan view of the vertical sliding window assembly as viewed from an exterior of a vehicle.
Figure 3:
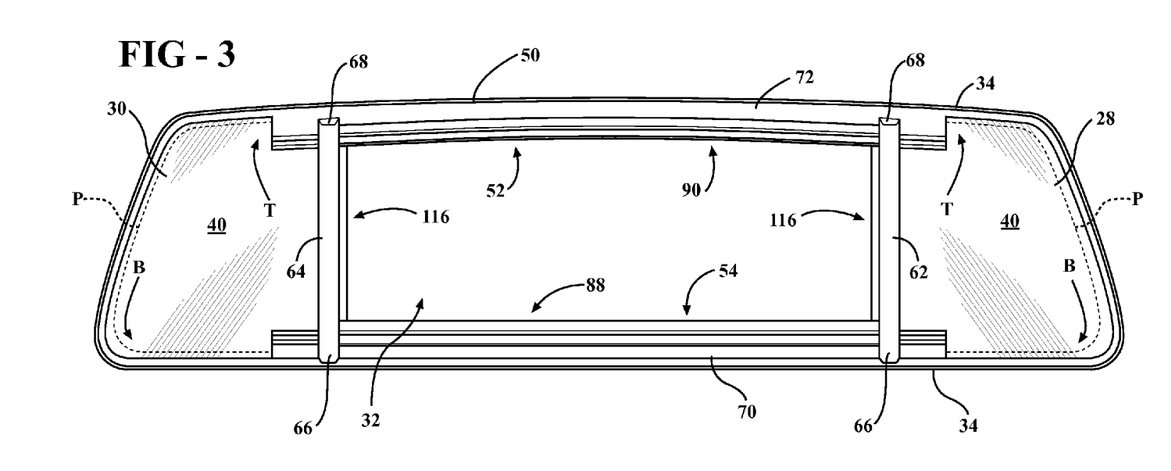
FIG. 3 is a plan view of the vertical sliding window assembly as viewed from an interior of the vehicle.
Figure 4:
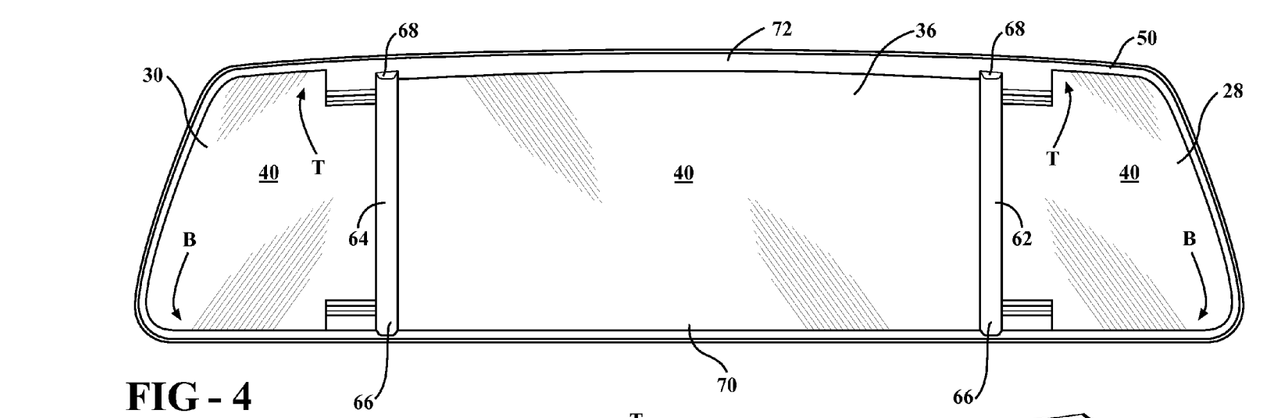
FIG. 4 is a cross-sectional view of a first support and a bottom seal coupled to the first support.

Referring to the Figures, wherein like numerals indicate like or corresponding parts throughout the several views, a vertical sliding window assembly 20 for a vehicle 22 is generally shown. Referring to FIG. 1, typically, the vertical sliding window assembly 20 is coupled to a rear window body or flange 24 (shown in FIG. 8) of a pickup truck. Generally, the flange 24 defines a rear opening 26 of the vehicle 22 for receiving the vertical sliding window assembly 20. It is to be appreciated that the vertical sliding window assembly 20 can be coupled at any suitable location of other types of vehicles or non-vehicles.

With reference to FIGS. 1-4, the vertical sliding window assembly 20 includes a first fixed panel 28 adapted to be fixed to the vehicle 22 and a second fixed panel 30 adapted to be fixed to the vehicle 22. The first and second fixed panels 28, 30 are spaced from each other to define an opening 32 therebetween. The first and second fixed panels 28, 30 each have a top edge T and a bottom edge B spaced from each other. The first and second fixed panels 28, 30 also have a periphery P. The periphery P defines an outer limit 34 of the fixed panels 28, 30. The first and second fixed panels 28, 30 are coupled to the flange 24 of the vehicle 22. Typically, the first and second fixed panels 28, 30 are coupled to the flange 24 about the periphery P of the first and second fixed panels 28, 30.

The vertical sliding window assembly 20 further includes a sliding panel 36 movably coupled to the vehicle 22 between an open position and a closed position. As such, the sliding panel 36 moves relative to the first and second fixed panels 28, 30. Generally, the sliding panel 36 moves vertically, up and down, relative to the first and second fixed panels 28, 30. The sliding panel 36 covers the opening 32 when in the closed position as shown in FIGS. 2, 3, 6, and 7 and the sliding panel 36 uncovers the opening 32 when in the open position. It is to be appreciated that the sliding panel 36 is in the open position when the sliding panel 36 is partially covering the opening 32. In other words, the sliding panel 36 is in the open position when the sliding panel 36 is completely or partially uncovering the opening 32. As such, the sliding panel 36 is in the closed position when the sliding panel 36 completely covers the opening 32. It is to be appreciated that a plurality of sliding panel 36s can be utilized.

The vehicle 22 defines a pocket 38 for receiving the sliding panel 36 when the sliding panel 36 is in the open position. More specifically, as the sliding panel 36 moves from the closed position to the open position, the sliding panel 36 enters the pocket 38 of the vehicle 22. As such, at least a portion of the sliding panel 36 is hidden within the pocket 38 when the sliding panel 36 is in the open position.

The first and second fixed panels 28, 30 as well as the sliding panel 36 are typically formed of glass. It is to be appreciated that the first and/or second fixed panels 28, 30 and/or the sliding panel 36 can be formed of any suitable material(s) such as plastic, metal, etc. Further, it is to be appreciated that optionally heating grids can be coupled to each of the first and second fixed panels 28, 30, as well as the sliding panel 36, for defrosting the panels.

The first and second fixed panels 28, 30 and the sliding panel 36 each have an interior surface 40 facing an interior 42 of the vehicle 22 when the vertical sliding window assembly 20 is coupled to the vehicle 22. In addition, the first and second fixed panels 28, 30 and the sliding panel 36 each have an exterior surface 44 opposing a respective one of the interior surface 40 such that the exterior surface 44 face an exterior 46 of the vehicle 22 when the vertical sliding window assembly 20 is coupled to the vehicle 22. It is to be appreciated that optionally, appliqué 48 can be disposed between the first and second fixed panels 28, 30 adjacent the exterior surface 44 of the first and second fixed panels 28, 30 for aesthetic purposes.

The vertical sliding window assembly 20 may include a frame 50 coupled to the first and second fixed panels 28, 30. Generally, the frame 50 is disposed about the periphery P of the first and second fixed panels 28, 30. In certain embodiments, the frame 50 also extends between the first and second fixed panels 28, 30 about the opening 32 to define a top 52 and a bottom 54 of the opening 32. Said differently, the frame 50 may span the opening 32 between the first and second fixed panels 28, 30.

Figure 7:
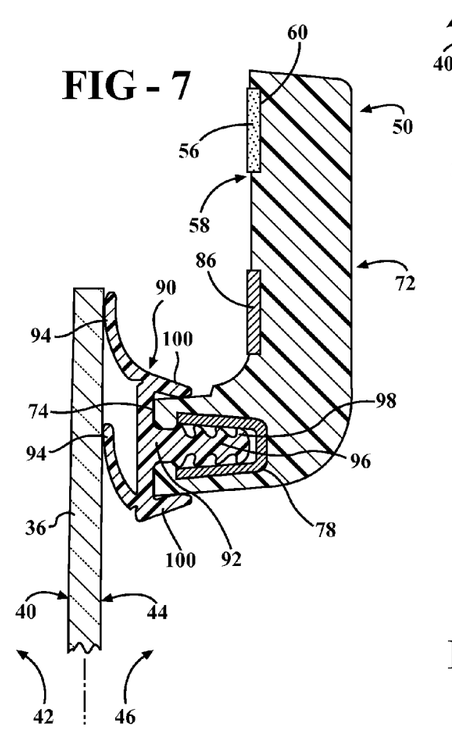
FIG. 7 is a perspective view of the second support cooperating with a second vertical track.
Figure 8:
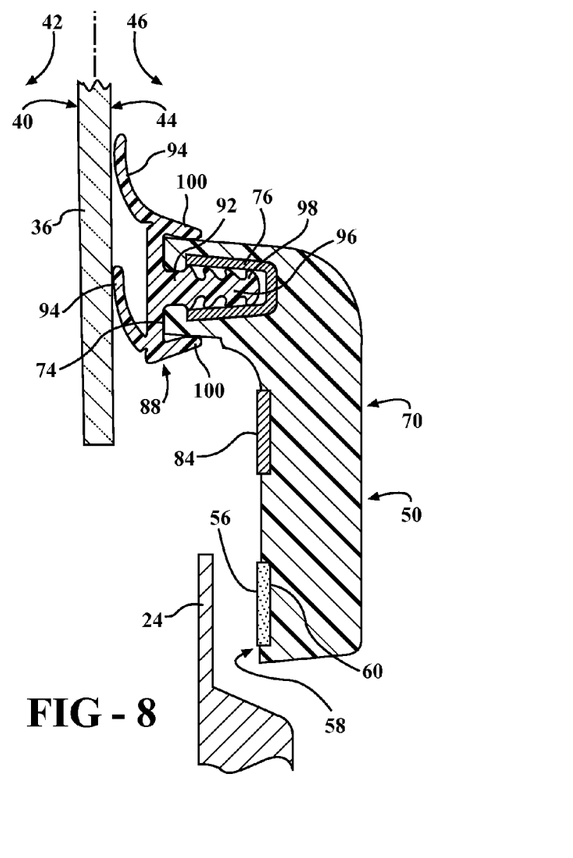
FIG. 8 is a cross-sectional view of the second support and a top seal coupled to the second support.

With reference to FIGS. 7 and 8, an adhesive mechanism 56 is utilized to mount or bond the vertical sliding window assembly 20 to the vehicle 22. Generally, the adhesive mechanism 56 is disposed about the periphery P of the fixed panels 28, 30 for bonding the fixed panels 28, 30, and therefore the vertical sliding window assembly 20, to the flange 24 of the vehicle 22. Mounting the vertical sliding window assembly 20 to the flange 24 covers the rear opening 26 of the vehicle 22. When the frame 50 is present, the frame 50 may have a mounting surface 58 for receiving the adhesive mechanism 56 and the frame 50 is adhered or bonded to the flange 24 of the vehicle 22 through the mounting surface 58. In certain embodiments, the frame 50 defines a recess 60 facing the flange 24 for receiving the adhesive mechanism 56. The recess 60 can extend completely around the periphery P of the frame 50 or can be at any suitable location around the frame 50.

Typically, the adhesive mechanism 56 is an adhesive bead. Typically, the adhesive bead comprises urethane. For example, the adhesive bead 56 may be a urethane adhesive. It is to be appreciated that any suitable adhesive mechanism 56 can be utilized to mount or bond the frame 50 to the flange 24 of the vehicle 22. It is to be further be appreciated that a primer can be applied to the frame 50 before applying the adhesive.

The vertical sliding window assembly 20 further includes a first vertical track 62 and a second vertical track 64 spaced from each other. It is to be appreciated that the first and second vertical tracks 62, 64 can be commonly referred to as vertical pillar tracks. Typically, the first and second vertical tracks 62, 64 are disposed vertically in a substantially spaced and parallel relationship.

Figure 5:
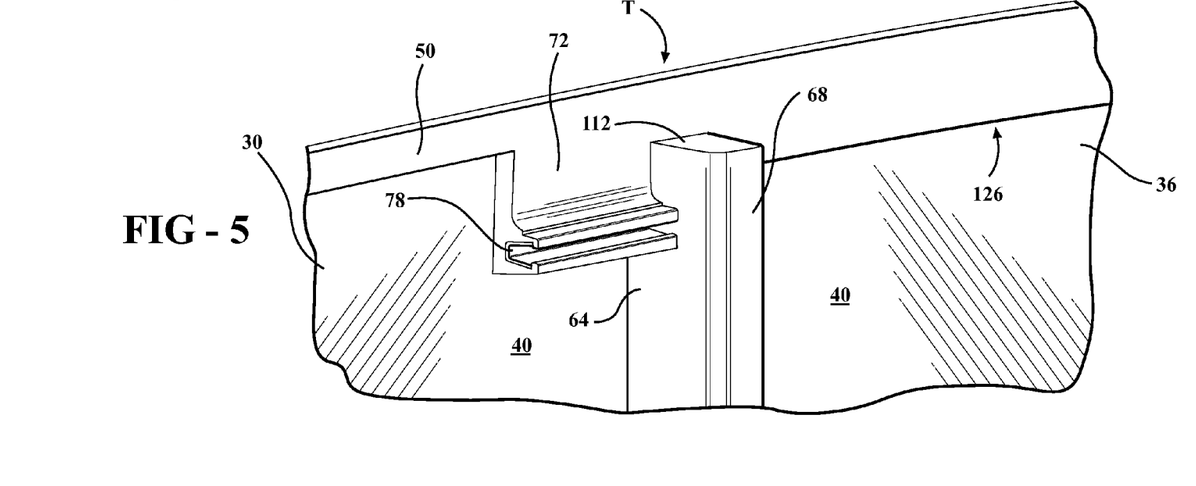
FIG. 5 is a plan view of a frame disposed about a periphery of a first fixed panel and a second fixed panel with a sliding panel removed.
Figure 6:
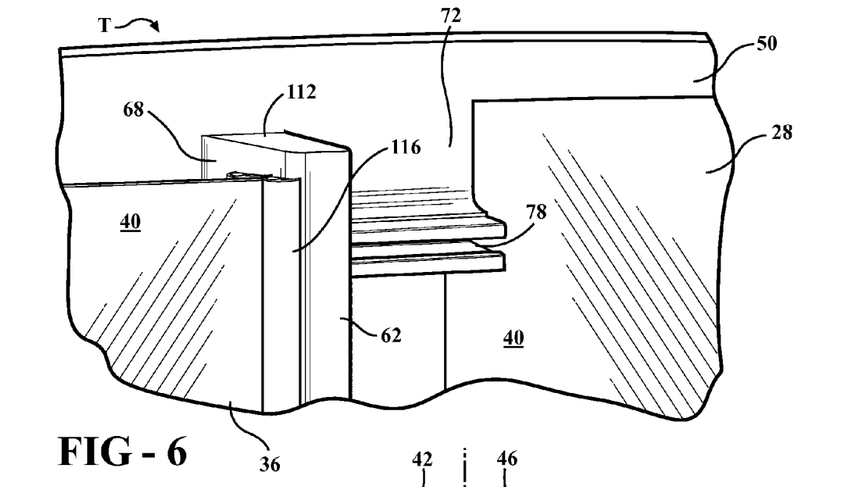
FIG. 6 is a perspective view of a second support cooperating with a first vertical track.

The first vertical track 62 is coupled to and extends between the top and bottom edges T, B of the first fixed panel 28. The second vertical track 64 is coupled to and extends between the top and bottom edges T, B of the second fixed panel 30. As best shown in FIGS. 5 and 6, the first vertical track 62 is disposed along the interior surface 40 of the first fixed panel 28 and the second vertical track 64 is disposed along the interior surface 40 of the second fixed panel 30 such that the first and second vertical tracks 62, 64 are disposed adjacent the opening 32.

The first and second vertical tracks 62, 64 each define a bottom end 66 and a top end 68 spaced from each other. The bottom end 66 of the first vertical track 62 is adjacent the bottom edge B of the first fixed panel 28 and the top end 68 of the first vertical track 62 is adjacent the top edge T of the first fixed panel 28. Similarly, the bottom end 66 of the second vertical track 64 is adjacent the bottom edge B of the second fixed panel 30 and the top end 68 of the second vertical track 64 is adjacent the top edge T of the second fixed panel 30.

The bottom end 66 of the first vertical track 62 terminates between the top and bottom edges T, B of the first fixed panel 28 and the bottom end 66 of the second vertical track 64 terminates between the top and bottom edges T, B of the second fixed panel 30. Additionally, the bottom and top ends 66, 68 of the first and second vertical tracks 62, 64 are typically spaced from where the adhesive mechanism 56 is applied to the fixed panels 28, 30. For example, when the adhesive mechanism 56 is applied to the periphery P of the fixed panels 28, 30, the first and second vertical tracks 62, 64 are spaced from the periphery P of the fixed panels 28, 30 such that the first and second vertical tracks 62, 64 are completely within the outer limit 34 of the fixed panels 28, 30. When the frame 50 is present and the adhesive mechanism 56 is applied to the frame 50, the first and second vertical tracks 62, 64 are disposed between the frame 50. More specifically, the bottom and top ends 66, 68 of the first and second vertical tracks 62, 64 are spaced from the frame 50. Because the bottom and top ends 66, 68 of the first and second vertical tracks 62, 64 do not overlap the frame 50, the first and second vertical tracks 62, 64 do not overlap the frame 50. Therefore, the first and second vertical tracks 62, 64 are spaced from the adhesive mechanism 56 applied to the frame 50. For example, when the frame 50 has the mounting surface 58 for receiving the adhesive mechanism 56, the first and second vertical tracks 62, 64 may be spaced from the mounting surface 58 of the frame 50. Additionally, the bottom end 66 of the first and second vertical tracks 62, 64 are spaced from the flange 24 of the vehicle 22.

Spacing the first and second vertical tracks 62, 64 from the periphery P of the fixed panels 28, 30 or the frame 50 if present, ensures that the first and second vertical tracks 62, 64 of the vertical sliding window assembly 20 are spaced from the adhesive mechanism 56 such that the adhesive mechanism 56 is uninterrupted by the first and second vertical tracks 62, 64. Said differently, the first and second vertical tracks 62, 64 do not cross the adhesive mechanism 56. Because the adhesive mechanism 56 is uninterrupted, the complete periphery P of the fixed panels 28, 30 can receive the adhesive mechanism 56 thereby providing a stronger bond as compared to adhesive mechanisms that have gaps in them to allow tracks to cross the adhesive mechanism.

Additionally, having the first and second vertical tracks 62, 64 spaced from the periphery P, or the frame 50 if present, allows the vertical sliding window assembly 20 to be more easily mounted or bonded to the flange 24. For example, spacing the first and second vertical tracks 62, 64 from the periphery P of the fixed panels 28, 30 allows the vertical sliding window assembly 20 to be mounted or bonded to the flange 24 without smearing the adhesive. Furthermore, when the sliding panel 36 is disposed in the closed position, the adhesive can be applied to the vertical sliding window assembly 20, and the vertical sliding window assembly 20 can be mounted/bonded to the flange 24 for preventing the sliding panel 36 from interfering with the mounting/bonding process.

Referring to FIGS. 3-8, the vertical sliding window assembly 20 may include a first support 70 and a second support 72 spaced from each other. The second support 72 is spaced above the first support 70. In other words, the first and second supports 70, 72 are disposed horizontally in a substantially spaced and parallel relationship. Further, the first and second supports 70, 72 are disposed along the interior surface 40 of the first and second fixed panels 28, 30 such that the first and second supports 70, 72 span across the opening 32. The first and second supports 70, 72 provide structural support as discussed further below.

When the first and second supports 70, 72 are present, the first and second vertical tracks 62, 64 may be coupled to the first and second supports 70, 72. In such an embodiment, the first and second vertical tracks 62, 64 are disposed transverse to the first and second supports 70, 72. More specifically, the bottom end 66 of the first and second vertical tracks 62, 64 is coupled to the first support 70 and the top end 68 of the first and second vertical tracks 62, 64 is coupled to the second support 72.

It is to be appreciated that the first and second vertical tracks 62, 64 may be integral with the first and second supports 70, 72 such that the first and second vertical tracks 62, 64 are supported by the first and second supports 70, 72. It is to be appreciated that the first and/or second vertical tracks 62, 64 can be attached to the first and/or second supports 70, 72 by any suitable method. Further, it is to be appreciated that the first and second vertical tracks 62, 64 can be positioned in any other suitable orientation or location.

When the frame 50 is present, the first and second supports 70, 72 may be coupled to the frame 50. In such an embodiment, the first and second supports 70, 72 extend from the frame 50 toward the sliding panel 36 and terminate at an end 74 that is spaced from the sliding panel 36. It is to be appreciated that the first and second supports 70, 72 may be integral with the frame 50 such that the first and second supports 70, 72 are formed simultaneously with the frame 50. Said differently, the first and second supports 70, 72 may not be separated from the frame 50 without permanently damaging either the first and second supports 70, 72 or the frame 50. It is to be appreciated that the first and/or second supports 70, 72 can be attached to the frame 50 by any suitable method. Further, it is to be appreciated that the first and second supports 70, 72 can be positioned in any other suitable orientation or location.

The vertical sliding window assembly 20 may include a first cross-bar 76 disposed in the end 74 of the first support 70 and a second cross-bar 78 disposed in the end 74 of the second support 72. Each of the cross-bars 76, 78 define a slot 80, 82 opening toward the sliding panel 36. More specifically, the first cross-bar 76 defines a first slot 80 facing the interior 42 of the vehicle 22. Likewise, the second support 72 defines a second slot 82 facing the interior 42 of the vehicle 22. The first and second cross-bars 76, 78 provide structural support to the first and second supports 70, 72. The first and second cross-bars 76, 78 are disposed in the first and second supports 70, 72 such that the first and second slots 80, 82 open toward the sliding panel 36.

Because the first and second cross-bars 76, 78 are disposed within the first and second supports 70, 72, the first and second cross-bars 76, 78 may also span across the opening 32 between the fixed panels 28, 30. The first and second cross-bars 76, 78 each define a generally u-shaped configuration. It is to be appreciated that the first and second cross-bars 76, 78 can be any other suitable configuration or orientation.

In certain embodiments, the vertical sliding window assembly 20 further includes a first plate 84 disposed in the first support 70 and a second plate 86 disposed in the second support 72. The first and second plates 84, 86 structurally support the first and second supports 70, 72. The first plate 84 is spaced from the first cross-bar 76 and the second plate 86 is spaced from the second cross-bar 78. It is to be appreciated that the first and/or second plates 84, 86 are optional and can be in any suitable location. As such, the first plate 84 can be utilized without the second plate 86, and vise versa, or both the first and second plates 84, 86 can be eliminated.

The first and second cross-bars 76, 78 and the first and second plates 84, 86 are typically formed of a metal material. More typically, the metal material is steel. In certain embodiments, the metal material is an alloy. Suitable alloys include aluminum and/or iron alloys. It is to be appreciated that the first and second cross-bars 76, 78 and the first and second plates 84, 86 can be formed of polymeric material(s), such as plastic material(s), and/or any other suitable material(s).

The vertical sliding window assembly 20 may include a bottom seal 88 mounted in the first slot 80 of the first cross-bar 76 and a top seal 90 mounted in the second slot 82 of the second cross-bar 78. Generally, the bottom and top seals 88, 90 are disposed between the first and second vertical tracks 62, 64 for cooperating with the sliding panel 36 within the opening 32. The bottom and top seals 88, 90 face the exterior surface 44 of the sliding panel 36. As such, the bottom and top seals 88, 90 are adjacent the exterior 46 of the vehicle 22. Hence, the bottom and top seals 88, 90 engage the sliding panel 36 when in the closed position for preventing fluid from entering into the interior 42 of the vehicle 22. Specifically, the bottom and top seals 88, 90 each engage the exterior surface 44 of the sliding panel 36 when in the closed position. It is to be appreciated that the bottom seal 88 may remain in contact with the sliding panel 36 even when the sliding panel 36 is in the open position.

The bottom and top seals 88, 90 each include a body portion 92 having at least one lip 94 extending therefrom. In certain embodiments, the lip 94 is further defined as a plurality of lips 94 spaced from each other. The lips 94 of the bottom and top seals 88, 90 face the exterior surface 44 of the sliding panel 36. The lips 94 of the bottom and top seals 88, 90 engage the exterior surface 44 of the sliding panel 36 when in the closed position.

The bottom and top seals 88, 90 each include a protrusion 96 such that the protrusion 96 of the bottom seal 88 is mounted in the first slot 80 of the first cross-bar 76 and the protrusion 96 of the top seal 90 is mounted in the second slot 82 of the second cross-bar 78. Specifically, the protrusion 96 of the bottom seal 88 extends from the body portion 92 of the bottom seal 88, and similarly, the protrusion 96 of the top seal 90 extends from the body portion 92 of the top seal 90. The protrusion 96 of the top seal 90 is spaced from the lips 94 of the top seal 90, and likewise, the protrusion 96 of the bottom seal 88 is spaced from the lips 94 of the bottom seal 88. More specifically, the lips 94 of the top seal 90 and the protrusion 96 of the top seal 90 are disposed in an opposing relationship. Similarly, the lips 94 of the bottom seal 88 and the protrusion 96 of the bottom seal 88 are disposed in an opposing relationship.

The protrusion 96 of each of the bottom and top seals 88, 90 include a plurality of barbs 98 for securing or mounting the bottom and top seals 88, 90 in the first and second slots 80, 82 respectively. It is to be appreciated that the protrusion 96 of each of the bottom and top seals 88, 90 can be any suitable configuration.

The bottom and top seals 88, 90 each include a plurality of fingers 100 spaced from each other. The protrusion 96 of the bottom seal 88 is disposed between the fingers 100 of the bottom seal 88 with the fingers 100 of the bottom seal 88 engaging the first support 70. Similarly, the protrusion 96 of the top seal 90 is disposed between the fingers 100 of the top seal 90 with the fingers 100 of the top seal 90 engaging the second support 72. Specifically, the fingers 100 of the bottom seal 88 engage an outer surface of the first support 70 and the fingers 100 of the top seal 90 engage an outer surface of the second support 72.

Figure 9:
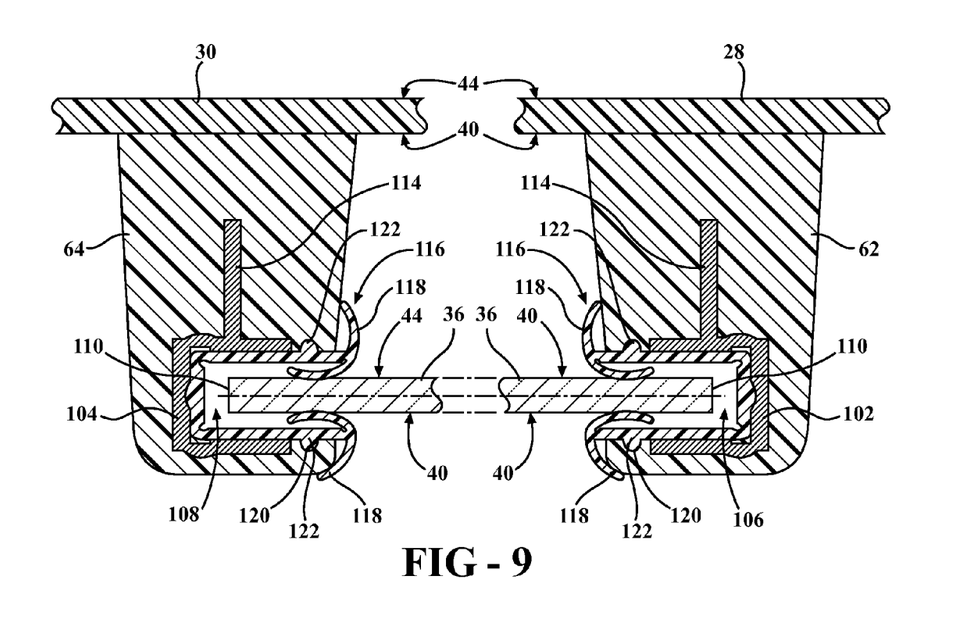
FIG. 9 is a cross-sectional view of the first and second vertical tracks including vertical seals with the sliding panel disposed between the vertical seal.

With reference to FIG. 9, the vertical sliding window assembly 20 may include a first rail 102 disposed in the first vertical track 62 and a second rail 104 disposed in the second vertical track 64. Hence, the first and second supports 70, 72 also support the first and second rails 102, 104. The first rail 102 defines a first channel 106 facing the second rail 104, and likewise, the second rail 104 defines a second channel 108 facing the first rail 102. Hence, the first and second channels 106, 108 face each other. The first and second rails 102, 104 are disposed in the first and second vertical tracks 62, 64 respectively such that the first and second channels 106, 108 are exposed to the interior 42 of the vehicle 22. The first and second rails 102, 104 support the sliding panel 36 and specifically, the first and second channels 106, 108 receive respective side edges 110 of the sliding panel 36 for guiding the sliding panel 36 during movement between the open and closed positions. Hence, the sliding panel 36 moves up and down relative to the first and second vertical tracks 62, 64 and the first and second rails 102, 104. The first and second rails 102, 104 each define a generally u-shaped configuration. It is to be appreciated that the first and second rails 102, 104 can be any other suitable configuration or orientation.

The first and second rails 102, 104 are typically formed of a metal material. More typically, the metal material is steel. In certain embodiments, the metal material is an alloy. Suitable alloys include aluminum and/or iron alloys. It is to be appreciated that the first and second rails 102, 104 can be formed of polymeric material(s), such as plastic material(s), and/or any other suitable material(s).

The bottom end 66 of the first and second vertical tracks 62, 64 is open such that the sliding panel 36 can assembled to the first and second vertical tracks 62, 64. In other words, the sliding panel 36 is inserted into the first and second channels 106, 108 through the bottom end 66 of the first and second vertical tracks 62, 64 during assembly. As such, after assembly, when the sliding panel 36 is in the open position, a portion of the sliding panel 36 is disposed below the frame 50 and adjacent the flange 24 of the vehicle 22. In other words, when the sliding panel 36 is in the open position, a portion of the sliding panel 36 is disposed below the bottom end 66 of the first and second vertical tracks 62, 64.

With reference to FIGS. 5 and 6, optionally, the top end 68 of the first and/or second vertical tracks 62, 64 include a stop 112 for stopping the sliding panel 36 when in the closed position. In other words, when the sliding panel 36 engages the stop 112, the sliding panel 36 is prevented from moving any further upwardly. It is to be appreciated that the top end 68 of the first and second vertical tracks 62, 64 can be open and a regulator can stop 112 the sliding panel 36 is the closed position such that the sliding panel 36 does not extend beyond the top end 68 of the first and second vertical tracks 62, 64.

With reference to FIGS. 9 and 11, the first and second rails 102, 104 each include an arm 114. Specifically, the arm 114 of the first rail 102 extends outwardly away from the first channel 106 and the arm 114 of the second rail 104 extends outwardly away from the second channel 108 for reinforcing said first and second vertical tracks 62, 64. Generally, the arm 114 of the first rail 102 extends into the first vertical track 62 toward the interior surface 40 of the first fixed panel 28 and the arm 114 of the second rail 104 extends into the second vertical track 64 toward the interior surface 40 of the second fixed panel 30. The arm 114 of the first and second rails 102, 104 prevents shrinkage during encapsulation. It is to be appreciated that the arm 114 can be any suitable configuration or location.

The first and second vertical tracks 62, 64 may overlap with the first and second supports 70, 72. In other words, the first and second vertical tracks 62, 64 vertically overlap the first and second supports 70, 72 which extend horizontally. Likewise, the first and second rails 102, 104 overlap with the first and second cross-bars 76, 78, and thus similarly, the first and second rails 102, 104 vertically overlap the first and second cross-bars 76, 78, which extend horizontally. Therefore, the arm 114 of the first and second rails 102, 104 each define a plurality of grooves (not shown) for preventing the arm 114 of the first and second rails 102, 104 from interfering with the first and second cross-bars 76, 78. In other words, the grooves allow the first and second supports 70, 72 to clear the first and second rails 102, 104.

The vertical sliding window assembly 20 may further include a plurality of vertical seals 116 with one of the vertical seals 116 disposed in the first channel 106 of the first vertical track 62 and another one of the vertical seals 116 disposed in the second channel 108 of the second vertical track 64. The vertical seals 116 receive respective side edges 110 of the sliding panel 36. The vertical seals 116 are complementary to respective first and second channels 106, 108.

The vertical seals 116 each include at least one lip 118, and more specifically, include a plurality of lips 118 with one of the lips 118 of each of the vertical seals 116 engaging the interior surface 40 of the sliding panel 36 and another one of the lips 118 of each of the vertical seals 116 engaging the exterior surface 44 of the sliding panel 36. The vertical seals 116 provide sealing between the sliding panel 36 and the first and second vertical tracks 62, 64.

Generally, the first and second vertical tracks 62, 64 each define at least one notch 120, and more specifically a plurality of notches 120 spaced from each other. The notches 120 are spaced from the first and second rails 102, 104. It is to be appreciated that the notches 120 can be any suitable configuration or location. Further, the vertical seals 116 each include a plurality of projections 122 engaging respective notches 120 for securing the vertical seals 116 in respective first and second channels 106, 108. Generally, the projections 122 are spaced from the lips 94. It is to be appreciated that the projections 122 can be any suitable configuration or location.

Figure 10:
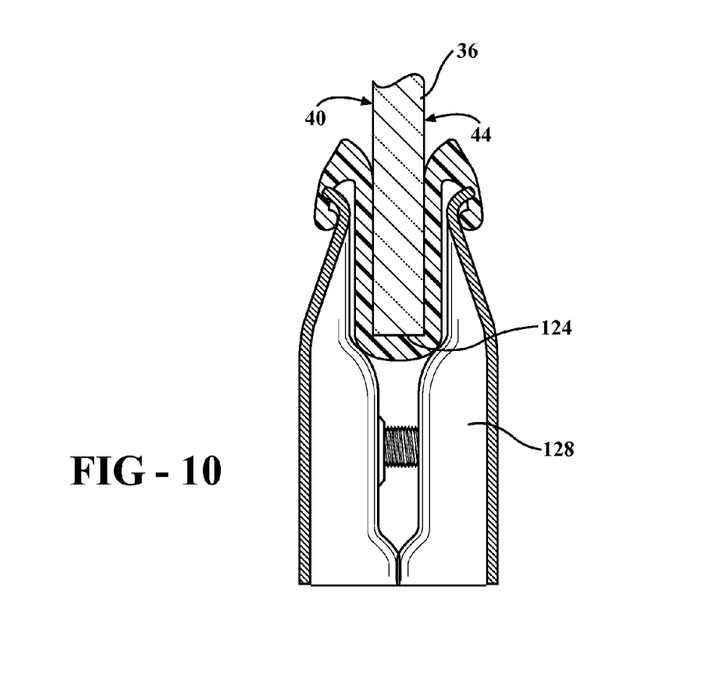
FIG. 10 is cross-sectional view of a clamp attached to the sliding panel.

With reference to FIG. 10, the sliding panel 36 also includes a bottom edge 124 adjacent the first support 70 and a top edge 126 adjacent the second support 72 when the sliding panel 36 is in the closed position. The top edge 126 of the sliding panel 36 is exposed, and therefore, when the sliding panel 36 is in the closed position, the top seal 90 may or may not be visible, and typically, the top seal 90 is not visible. For example, no seal is utilized on the top edge 126 of the sliding panel 36. Exposing the top edge 126 simplifies tooling and/or allows tooling lifters to pull out of center pillar channels during assembly. Generally, the sliding panel 36 and the first and second vertical tracks 62, 64 cooperate to provide an improved assembly process. It is to be appreciated that the bottom seal 88 may or may not be visible.

The vertical sliding window assembly 20 may further include a plurality of clamps 128 coupled to the bottom edge 124 of the sliding panel 36. More specifically, one of the clamps 128 is disposed adjacent one side edge of the sliding panel 36 and another one of the clamps 128 is disposed adjacent the other side edge of the sliding panel 36. Therefore, the clamps 128 are generally concealed by the first and second vertical tracks 62, 64 when the sliding panel 36 is in the closed position. It is to be appreciated that the clamps 128 can be any suitable configuration or location. It is to further be appreciated that the clamps 128 can be coupled to the sliding panel 36 after mounting the vertical sliding window assembly 20 to the vehicle 22 or at any other suitable assembly time. It is to be appreciated that optionally, an insert can be disposed between the sliding panel 36 and the clamps 128.

An actuator is typically coupled to the clamps 128 for moving the sliding panel 36 between the open and closed positions. The actuator can include a motor, a plurality of regulator tracks, a plurality of cables, and/or any other suitable components for moving the sliding panel 36 between the open and closed positions.

The frame 50 is typically coupled to the first and second fixed panels 28, 30 by any suitable method, such as for example, encapsulation, molding, bonding, etc. In addition, the first and second supports 70, 72 are typically coupled to the frame 50 by any suitable method, such as for example, encapsulation, molding, bonding, etc. Further, the first and second vertical tracks 62, 64 are typically coupled to the first and second supports 70, 72 by any suitable method, such as for example, encapsulation, molding, bonding, etc.

Generally, encapsulation results in an encapsulant that can be used to couple the frame 50 to the first and second fixed panels 28, 30, couple the first and second supports 70, 72 to the frame 50, and couple the first and second vertical tracks 62, 64 to the first and second supports 70, 72. In addition, encapsulation can be further defined as single-sided encapsulation, two-sided encapsulation, or three-sided encapsulation. With respect to encapsulation, the frame 50, the first and second supports 70, 72, and the first and second vertical tracks 62, 64 are formed of the encapsulant and are coupled to the respective components by encapsulation. It is to be appreciated that any type of encapsulation or adhesive surface bonding can be utilized for coupling the frame 50 to the first and second fixed panels 28, 30, coupling the first and second supports 70, 72 to the frame 50, and coupling the first and second vertical tracks 62, 64 to the first and second supports 70, 72.

When utilizing encapsulation, the encapsulant is typically formed of a plastic material(s) and more typically, thermoplastic material(s) and/or themoset material(s). Even more typically, the plastic material is polyvinyl chloride (PVC). It is to be appreciated that the encapsulant can be formed of various plastic material(s); various different types of reaction injection molding (RIM) materials; and/or any other suitable material(s) for encapsulation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vertical sliding window assembly for coupling to a flange of a vehicle, said vertical sliding window assembly comprising:
   a first fixed panel adapted to be fixed to the vehicle and having a top edge and a bottom edge spaced from each other;
   a second fixed panel adapted to be fixed to the vehicle and spaced from said first fixed panel to define an opening therebetween with said second fixed panel having a top edge and a bottom edge spaced from each other;
   a first vertical track coupled to and extending between said top and bottom edges of said first fixed panel with said first vertical track having a bottom end adjacent said bottom edge of said first fixed panel and a top end adjacent said top edge of said first fixed panel;
   a second vertical track coupled to and extending between said top and bottom edges of said second fixed panel with said second vertical track having a bottom end adjacent said bottom edge of said second fixed panel and a top end adjacent said top edge of said second fixed panel; and
   a sliding panel movable along said first and second vertical tracks relative to said fixed panels between a closed position and an open position such that a size of said opening can be modified;
   wherein said bottom end of said first vertical track terminates between said bottom and top edges of said first fixed panel and said bottom end of said second vertical track terminates between said bottom and top edges of said second fixed panel.

2. The vertical sliding window assembly as set forth in claim 1 wherein each of said fixed panels have a periphery defining an outer limit of said fixed panels with said first and second vertical tracks completely within said outer limit of said fixed panels.

3. The vertical sliding window assembly as set forth in claim 2 further comprising a frame coupled to said first and second fixed panels and spanning said opening between said fixed panels.

4. The vertical sliding window assembly as set forth in claim 3 wherein said frame is disposed about said periphery of said fixed panels.

5. The vertical sliding window assembly as set forth in claim 4 wherein said first and second vertical tracks are disposed between said frame.

6. The vertical sliding window assembly as set forth in claim 4 wherein said frame has a mounting surface for receiving an adhesive mechanism to couple said frame to the vehicle.

7. The vertical sliding window assembly as set forth in claim 6 wherein said first and second vertical tracks are spaced from said mounting surface of said frame.

8. The vertical sliding window assembly as set forth in claim 3 further comprising a first support and a second support spaced from each other and coupled to said frame wherein said first and second supports span across said opening between said fixed panels.

9. The vertical sliding window assembly as set forth in claim 8 wherein said first and second supports extend from said frame toward said sliding panel and terminate at an end that is spaced from said sliding panel.

10. The vertical sliding window assembly as set forth in claim 9 further comprising a first cross-bar disposed in said end of said first support and a second cross-bar disposed in said end of said second support with each of said cross-bars defining a slot opening toward said sliding panel.

11. The vertical sliding window assembly as set forth in claim 10 further comprising a bottom seal mounted in said slot of said first cross-bar and a top seal mounted in said slot of said second cross-bar with said seals engaging an exterior surface of said sliding panel for preventing fluid from entering into the vehicle.

12. The vertical sliding window assembly as set forth in claim 11 wherein said bottom end of said first and second vertical tracks is coupled to said first support and said top end of said first and second vertical tracks is coupled to said second support.

13. The vertical sliding window assembly as set forth in claim 1 further comprising a first rail disposed within said first vertical track and a second rail disposed in said second vertical track with each of the rails defining a channel for receiving a respective side edge of said sliding panel to guide said sliding panel between said open and closed positions.

14. The vertical sliding window assembly as set forth in claim 13 wherein said first and second rails each include an arm extending away from said channel and into a respective one of said first and second vertical tracks for reinforcing said first and second vertical tracks.

15. A vehicle comprising:
a flange defining a rear opening of said vehicle;
a vertical sliding window assembly comprising;
a first fixed panel adapted to be fixed to the vehicle and having a top edge and a bottom edge spaced from each other,
a second fixed panel adapted to be fixed to the vehicle and spaced from said first fixed panel to define an opening therebetween with said second fixed panel having a top edge and a bottom edge spaced from each other, a first vertical track coupled to and extending between said top and bottom edges of said first fixed panel with said first vertical track having a bottom end adjacent said bottom edge of said first fixed panel and a top end adjacent said top edge of said first fixed panel,
a second vertical track coupled to and extending between said top and bottom edges of said second fixed panel with said second vertical track having a bottom end adjacent said bottom edge of said second fixed panel and a top end adjacent said top edge of said second fixed panel, and
a sliding panel movable along said first and second vertical tracks relative to said fixed panels between a closed position and an open position such that a size of said opening can be modified,
wherein said bottom end of said first vertical track terminates between said bottom and top edges of said first fixed panel and said bottom end of said second vertical track terminates between said bottom and top edges of said second fixed panel; and
an adhesive mechanism disposed about said periphery of said fixed panels for bonding said vertical sliding window assembly to said flange to cover said rear opening;
wherein said bottom end of said first and second vertical tracks are spaced from said flange of said vehicle.

16. The vehicle as set forth in claim 15, wherein each of said fixed panels have a periphery defining an outer limit of said fixed panels with said first and second vertical tracks completely within said outer limit of said fixed panels.

17. The vehicle as set forth in claim 15 wherein said first and second vertical tracks of said vertical sliding window assembly are spaced from said adhesive mechanism such that said adhesive mechanism is uninterrupted by said first and second vertical tracks.

18. The vehicle as set forth in claim 15 wherein said vertical sliding window assembly further comprises a frame coupled to said first and second fixed panels and spanning said opening between said fixed panels.

19. The vehicle as set forth in claim 18 wherein said frame has a mounting surface for receiving said adhesive mechanism to couple said frame to said vehicle with said first and second vertical tracks spaced from said mounting surface of said frame.

20. The vehicle as set forth in claim 15 wherein said vertical sliding window assembly further comprises a first support and a second support spaced from each other and coupled to said frame and wherein said first and second supports span across said opening between said fixed panels.

21. The vehicle as set forth in claim 20 wherein said first and second supports extend from said frame toward said sliding panel and terminate at an end that is spaced from said sliding panel.

22. The vehicle as set forth in claim 20 wherein said bottom end of said first and second vertical tracks is coupled to said first support and said top end of said first and second vertical tracks is coupled to said second support.

23. The vehicle as set forth in claim 15 wherein said vertical sliding window assembly further comprises a first rail disposed within said first vertical track and a second rail disposed in said second vertical track with each of the rails defining a channel for receiving a respective side edge of said sliding panel to guide said sliding panel between said open and closed positions.

* * * * *